(12) United States Patent
Rick et al.

(10) Patent No.: US 8,136,832 B2
(45) Date of Patent: Mar. 20, 2012

(54) DASHBOARD SUPPORT PART HAVING A PASSENGER AIRBAG MODULE

(75) Inventors: Ulrich Rick, Braunweiler (DE); Udo Wagner, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/680,534

(22) PCT Filed: Jul. 17, 2008

(86) PCT No.: PCT/EP2008/005837
§ 371 (c)(1),
(2), (4) Date: Mar. 26, 2010

(87) PCT Pub. No.: WO2009/043399
PCT Pub. Date: Apr. 9, 2009

(65) Prior Publication Data
US 2010/0259032 A1    Oct. 14, 2010

(30) Foreign Application Priority Data
Sep. 27, 2007   (DE) .......................... 10 2007 046 212

(51) Int. Cl.
*B60R 21/16* (2006.01)
(52) U.S. Cl. .................................................. 280/728.2
(58) Field of Classification Search ............... 280/728.2
See application file for complete search history.

(56) References Cited

U.S. PATENT DOCUMENTS

| | | | |
|---|---|---|---|
| 5,961,142 A | 10/1999 | Shiraki et al. | |
| 6,250,669 B1 | 6/2001 | Ohmiya | |
| 6,502,851 B2 * | 1/2003 | Kitagawa | 280/728.2 |
| 2003/0011178 A1 | 1/2003 | Choi et al. | |

FOREIGN PATENT DOCUMENTS

| | | |
|---|---|---|
| DE | 3611486 A1 | 10/1987 |
| DE | 4338666 * | 5/1995 |
| DE | 4415468 C1 | 11/1995 |
| DE | 19618817 * | 11/1997 |
| DE | 19646548 A1 | 5/1998 |
| DE | 19745894 A1 | 4/1999 |
| DE | 29623848 * | 3/2000 |
| DE | 19949170 A1 | 4/2000 |
| DE | 10108685 C1 | 4/2002 |
| DE | 20220287 U1 | 5/2003 |
| DE | 10346012 A1 | 7/2004 |

(Continued)

OTHER PUBLICATIONS

International Searching Authority, International Search Report for Application No. PCT/EP2008/005837, dated Sep. 1, 2009.

*Primary Examiner* — Eric Culbreth
(74) *Attorney, Agent, or Firm* — Ingrassia Fisher & Lorenz, P.C.

(57) ABSTRACT

A dashboard support part is provided having an airbag exit opening and a module fastening frame, on which a passenger airbag module is directly and removably fastened, the module fastening frame being implemented integrally with the dashboard support part. The passenger airbag module is fastened on the module fastening frame using screws and/or using projections of the passenger airbag module inserted into pockets of the module fastening frame transversely to a firing direction of the passenger airbag module.

12 Claims, 2 Drawing Sheets

FOREIGN PATENT DOCUMENTS

| | | | |
|---|---|---|---|
| DE | 10312947 | * | 11/2004 |
| DE | 10312948 | * | 11/2004 |
| DE | 10325433 | * | 1/2005 |
| DE | 10325435 | * | 1/2005 |
| DE | 10 2004 023 682 | * | 12/2005 |
| DE | 102004023682 A1 | | 12/2005 |
| EP | 0826564 A1 | | 3/1998 |
| GB | 2277908 A | | 11/1994 |

* cited by examiner

DASHBOARD SUPPORT PART HAVING A PASSENGER AIRBAG MODULE

CROSS-REFERENCE TO RELATED APPLICATIONS

This application is a U.S. National-Stage entry under 35 U.S.C. §371 based on International Application No. PCT/EP2008/005837, filed Jul. 17, 2008, which was published under PCT Article 21(2) and which claims priority to German Application No. 102007046212.5, filed Sep. 27, 2007, which are all hereby incorporated in their entirety by reference.

TECHNICAL FIELD

The present invention relates to a dashboard support part having an airbag exit opening and a module fastening frame, on which a passenger airbag module is directly and removably fastened, the module fastening frame being implemented integrally with the dashboard support part.

BACKGROUND

In order to increase the passive safety of a passenger of a motor vehicle, situating a passenger airbag module on the side of a dashboard facing away from the passenger compartment so that an unfolding airbag of the passenger airbag module exits through an airbag exit opening in the dashboard, preferably while opening a flap, tearing open a perforation, or the like, in order to catch the passenger moving forward under inertial forces, is known. The reaction forces that result from the recoil of the unfolding airbag and in particular a gas generator inflating it must be absorbed and supported in the motor vehicle in order to ensure a proper unfolding procedure of the airbag.

Because dashboards are frequently only implemented having a low strength for reasons of design, weight, and production, fastening the passenger airbag module on a more stable crossbeam is known, for example, from DE 197 45 894 A1 or DE 36 11 486 A1. DE 44 15 468 C1, DE 101 08 685 C1, or DE 196 46 548 A1 propose fixing on the dashboard in addition to the fastening on the crossbeam. Because, as described, the dashboard generally has a low strength, the cited publications additionally propose a separate, preferably metal connection element, via which the passenger airbag module is indirectly fastened on the dashboard.

Such solutions are not optimal in regard to the production and installation effort and the weight. Therefore, DE 10 2004 023 682 A1 proposes a dashboard support part according to the preamble of Claim 1, which is produced from plastic and has a module fastening frame implemented integrally with the dashboard support part in the area of an airbag exit opening, which has the form of a double-walled open pot and on which a passenger airbag module is removably fastened by insertion in the firing direction while locking detent lugs in corresponding recesses of the module fastening frame. In order to stiffen the module fastening frame, an airbag cover engages between the two walls of the double-walled pot, which is supported against the dashboard support part using reinforcement ribs.

Although the dashboard support part is reinforced in the area of the airbag exit opening by the double-walled and rib-reinforced implementation of the integral module fastening frame so that it can absorb and support the reaction forces of the activated passenger airbag module, these forces must be completely introduced via the detent connection of the passenger airbag module inserted in the firing direction and thus unfavorably load the detent connection.

At least one object of the present invention is therefore to provide a dashboard support part having a passenger airbag module which has an increased connection strength between dashboard support part and passenger airbag module. In addition, other objects, desirable features, and characteristics will become apparent from the subsequent summary and detailed description, and the appended claims, taken in conjunction with the accompanying drawings and this background.

SUMMARY

A dashboard support part according to an embodiment of the invention has an airbag exit opening, through which an unfolding airbag of a passenger airbag module can exit. The airbag exit opening can advantageously be covered by a film, a flap configuration, or the like, and is only opened by the unfolding airbag. A module fastening frame is implemented integrally with the dashboard support part, on which the passenger airbag module is removably fastened directly, i.e., directly without separate components interposed.

According to a first embodiment of the present invention, the removable fastening of the passenger airbag module on the module fastening frame is performed using screws. For this purpose, fastening surfaces may preferably be provided on the module fastening frame for the contact of the passenger airbag module, to which the passenger airbag module is screwed. Such a screw connection on the module fastening frame allows a similarly installation-friendly and removable fastening of the passenger airbag module on the dashboard support part, for example, for maintenance or replacement purposes, and also a fixed connection, via which the reaction forces of the unfolding airbag and particularly a gas generator of the passenger airbag module filling this airbag may be absorbed and dissipated into the dashboard support part. A reliable fastening of the passenger airbag module on the dashboard support part is thus provided and the connection strength is increased.

According to a second embodiment of the present invention, the fastening of the passenger airbag module on the module fastening frame is performed using projections of the passenger airbag module inserted into pockets transversely to a firing direction of the passenger airbag module. These projections and/or these pockets may preferably be implemented as rigid, because they do not form a detent connection, whose installation necessarily requires an elastic yielding of at least one connection element, but rather are inserted.

Because the projections are inserted into the pockets transversely to the firing direction of the passenger airbag module, they may absorb and support higher reaction forces, in particular in comparison to a detent connection of a passenger airbag module inserted in the firing direction. In contrast to a detent connection, the detachment of which again requires elastic deformation of at least one connection element and is additionally made more difficult by the geometric implementation of detent lug or receptacle opposite to the installation direction, the uninstallation of a passenger airbag module which is fastened using projections inserted into pockets transversely to the firing direction, for example, for maintenance or replacement purposes, is simplified.

The above-mentioned embodiments may also be combined with one another, in that projections of the passenger airbag module are inserted into pockets in the module fastening frame transversely to its firing direction and the passenger airbag module is additionally screwed onto the module fastening frame. In particular, the reaction forces acting essentially in the firing direction may be absorbed via the preferably rigid projections inserted into the pockets transversely to the firing direction, while the screw connection fixes the passenger airbag module transversely to the firing direction. In this way, for example, the passenger airbag module may firstly be moved transversely to the firing direction, so that its projections engage in the pockets of the module fastening frame, and subsequently may also be fixed in this transverse direction by screwing.

In this combined embodiment, the screwing can be performed via the projections inserted into the pockets.

Additionally or alternatively, the passenger airbag module can also be screwed onto other fastening surfaces of the module fastening frame.

A dashboard support part according to one of the above-mentioned embodiments preferably comprises one or more fastening surfaces for the contact and/or support of the passenger airbag module, which are situated essentially transversely to the firing direction of the passenger airbag module. If, as previously described, the passenger airbag module is screwed onto such fastening surfaces or if such fastening surfaces are implemented in pockets, into which projections of the passenger airbag module are inserted transversely to its firing direction, particularly favorable introduction and distribution of the reaction forces to be supported result. In addition, a particularly compact and space-saving configuration of the passenger airbag module is made possible in this way.

One or more fastening surfaces are preferably situated along the periphery of the airbag exit opening. This reduces the lever arms and thus the bending torques to be absorbed by the fastening of the passenger airbag module on the module fastening frame, which result from recoil forces of the passenger airbag module.

Fastening surfaces may preferably be situated along opposing sides of the airbag exit opening, to thus support a tilting torque of the passenger airbag module. Fastening surfaces may either be situated opposite to one another or offset to one another, in order to simplify the installation or to distribute the force is to be absorbed more uniformly, for example.

If the firing direction of the passenger airbag module is oriented essentially perpendicularly to a surface of the dashboard support part, in particular an outer side facing toward the passenger compartment and/or a rear side of the dashboard support part facing away from the passenger compartment, it is preferable to implement one or more fastening surfaces essentially parallel to this surface of the dashboard support part, in order to achieve a particularly favorable force distribution and a compact, short construction.

The module fastening frame can advantageously be implemented continuously, i.e., along the entire circumference, or partially, i.e., in areas of the circumference, as double-walled or multi-walled along the circumference of the airbag exit opening. The module fastening frame implemented integrally with the dashboard support part is thus reinforced in a simple way and thus increases the reliability of the fastening of the passenger airbag module.

It has been shown that in particular a double-walled or multi-walled implementation of the module fastening frame in one or more corner areas of the airbag exit opening decisively increases the carrying capacity and/or strength, because, on the one hand, particularly high forces occur in these areas as a result of notch effects and, on the other hand, production-related material in homogeneities, for example, weaken the module fastening frame.

In order to reinforce the module fastening frame, it is also advantageous to connect it to the remaining dashboard support part via one or more ribs. If the module fastening frame is implemented as double-walled or multi-walled, the ribs may be situated between two walls of the module fastening frame and/or on an outer wall of the module fastening frame in relation to the airbag exit opening.

In particular if the module fastening frame already has a high strength as a result of a double-walled or multi-walled embodiment and/or stiffening by ribs, it can preferably be implemented in one piece, i.e., without a separate reinforcement element, which also saves weight and an installation step.

Because of a corresponding fixed implementation of the module fastening frame implemented integrally with the dashboard support part and the direct fastening of the passenger airbag module thereon, fastening on other vehicle structures, in particular a crossbeam, can advantageously be dispensed with, which increases the design freedom and additionally saves installation effort and weight.

The dashboard support part and the module fastening frame implemented integrally therewith are preferably produced from plastic, in particular from thermoplastic, such as polypropylene or the like.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
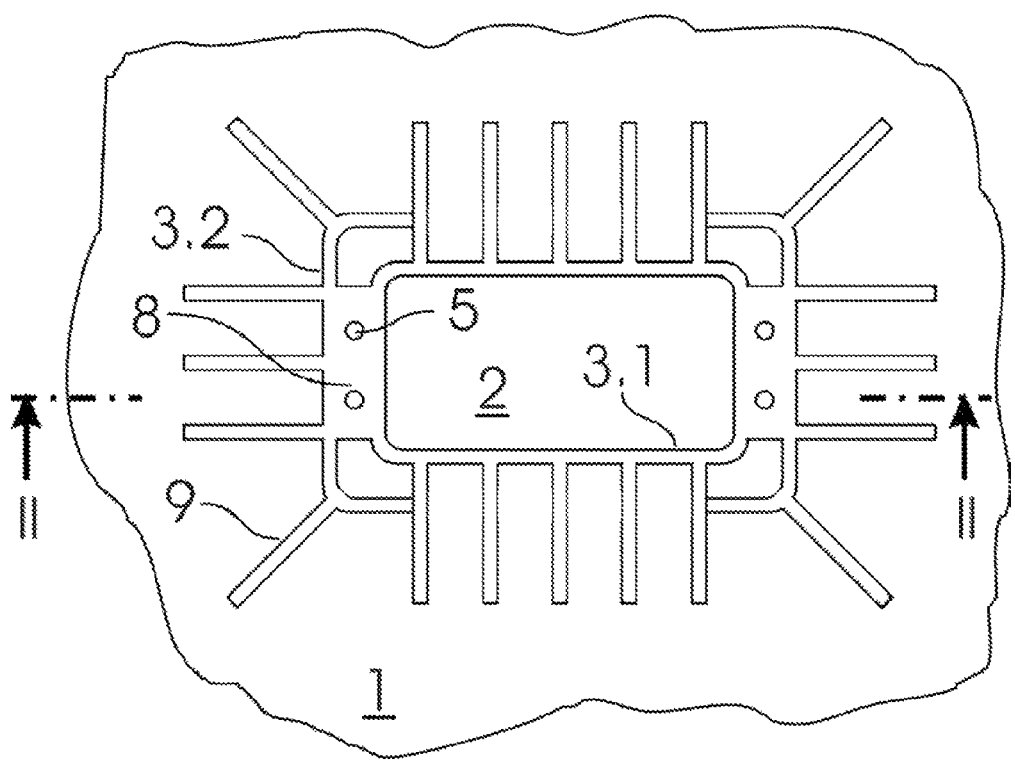
FIG. 1 shows a dashboard support part according to a first embodiment of the present invention in a top view from the rear.
Figure 2:
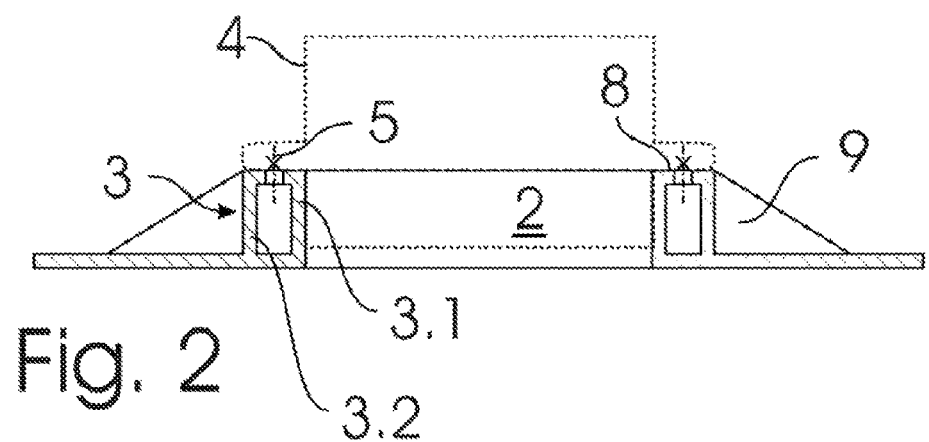
FIG. 2 shows a section through the dashboard support part according to FIG. 1 along line II-II.

A dashboard support part 1 according to a first embodiment of the present invention is shown in FIG. 1 in a top view from the rear, i.e., a side facing away from the passenger compartment, and in FIG. 2 in a section along line II-II in FIG. 1.

The dashboard support part 1 is produced from plastic and has an essentially rectangular airbag exit opening 2, which is closed in relation to the passenger compartment by a perforated film (not shown) and can be destructively opened by an unfolding airbag of a passenger airbag module 4.

A module fastening frame 3 (cf. FIG. 2) is implemented integrally with the dashboard support part 1 along the circumference of the airbag exit opening 2. The module fastening frame 3 has an inner wall 3.1 in relation to the airbag exit opening 2, which extends continuously along the entire circumference of the airbag exit opening 2. At an interval to this inner wall 3.1, the module fastening frame 3 has an outer wall 3.2 in relation to the airbag exit opening 2, which is essentially parallel to the inner wall. This outer wall extends along the narrow sides (on the left and right in FIG. 1) and over the corner areas of the airbag exit opening 2, which are implemented having a radius, so that the module fastening frame 3 is implemented as double-walled in these corner areas in particular. Reinforcement ribs 9 are implemented on the inner wall 3.1 and/or the outer wall 3.2, which are connected to the dashboard support part 1 and support the module fastening frame 3 against it.

The inner and outer walls 3.1, 3.2 of the module fastening frame 3 are connected via a fastening surface 8 in each case, which is implemented integrally with the inner and outer walls 3.1, 3.2, in the area of the narrow sides (on the left and right in FIG. 1) of the airbag exit opening 2. Holes are provided in these fastening surfaces 8, through which screws, which are indicated in FIG. 2, may penetrate, in order to screw a passenger airbag module 4, which is not shown for a better overview in FIG. 1 and is indicated by dashed lines in FIG. 2, to the module fastening frame 3. For this purpose, the holes may have corresponding internal threads, into which the screws 5 are screwed. Because the module fastening frame 3 is produced from plastic, however, in a preferred refinement (not shown), counter nuts are situated between the inner wall 3.1 and the outer wall 3.2 below the fastening surfaces 8, into which the screws 5 may be screwed. Because the module fastening frame 3 is only implemented as double-walled in the area of the narrow sides and corner areas of the airbag exit opening 2, these counter nuts (not shown) may be readily installed at the appropriate location.

Through the screw connection of the passenger airbag module 4 using the screws 5 on the module fastening frame 3, which has a high strength and rigidity due to the partially double-walled, integral, and rib-reinforced implementation, reaction forces which result from recoil forces of the passenger airbag module (upward in FIG. 2) may be absorbed particularly well by the screws 5 and relayed via the rigid module fastening frame 3 into the dashboard support part 1. A similarly installation-friendly and reliable fastening of the passenger airbag module thus results.

Figure 3:
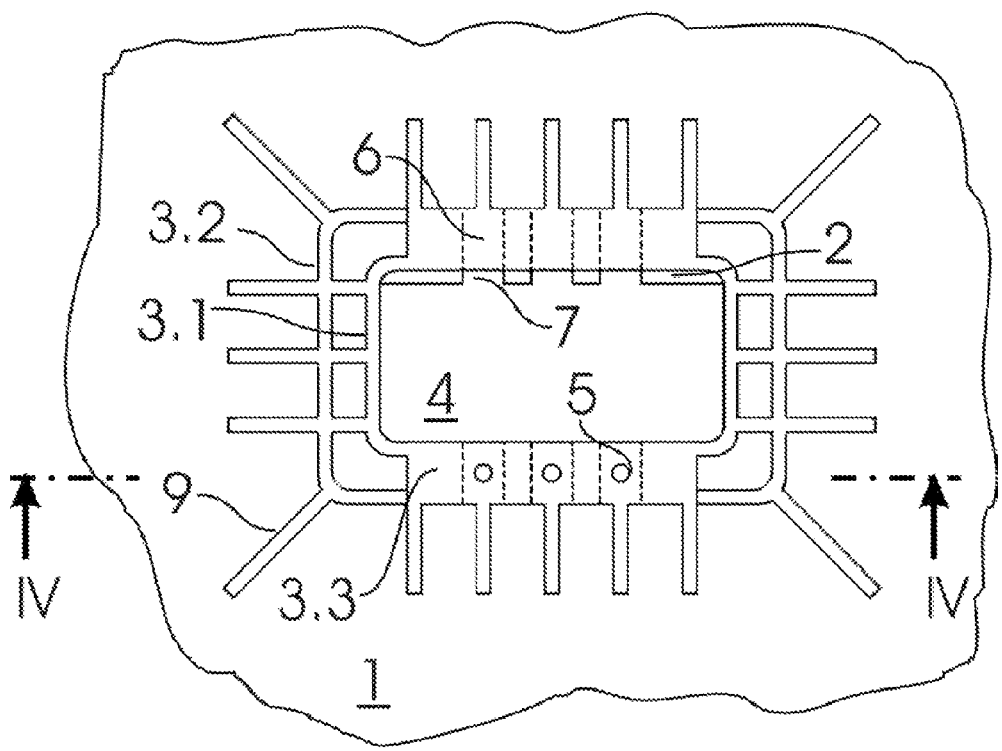
FIG. 3 shows a dashboard support part according to a second embodiment of the present invention in a top view from the rear.
Figure 4:
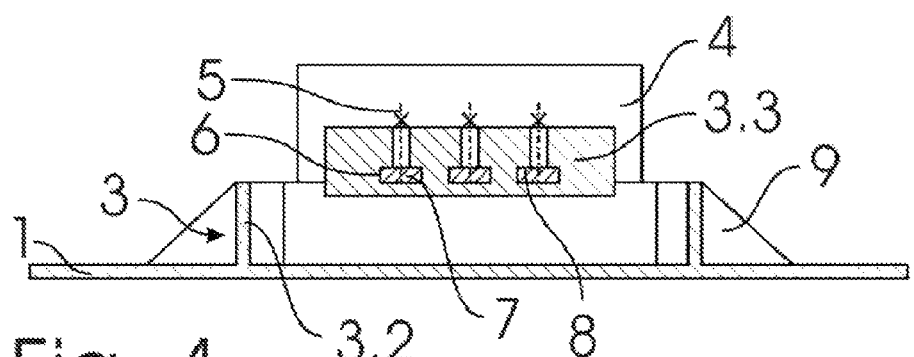
FIG. 4 shows a section through the dashboard support part according to FIG. 3 along line IV-IV.

FIG. 3 and FIG. 4 show an illustration corresponding to FIG. 1, FIG. 2 of a dashboard support part 1 according to a second embodiment of the present invention. Features and/or components corresponding to the first embodiment are designated by identical reference numerals, so that only the differences between the first and second embodiments are discussed hereafter.

The module fastening frame 3 is implemented as continuously double-walled along the entire circumference of the airbag exit opening 2 in the second embodiment, having an inner wall 3.1 and an outer wall 3.2 in relation to the airbag exit opening 2. The reinforcement ribs 9 are implemented both between the inner and outer walls 3.1, 3.2 and also on the side of the outer wall 3.2 opposite to the inner wall 3.1 and more or less penetrate the outer wall 3.2. The inner and outer walls 3.1, 3.2 are connected via a connection area 3.3, which is implemented integrally with the two walls 3.1, 3.2, on the opposing longitudinal sides (top and bottom in FIG. 3) of the airbag exit opening 2.

In the connection area 3.3, pockets 6 are implemented, which extend through the connection area 3.3 transversely to the firing direction of the passenger airbag module 4. In a refinement (not shown) of the embodiment shown, the connection area 3.3 is not implemented continuously having the same wall height on one or both longitudinal sides of the airbag exit opening, but rather has recesses between the areas in which the pockets 6 are situated in order to save material and weight.

The passenger airbag module 4, which is only schematically indicated in FIG. 3, FIG. 4, has rigid projections 7 on opposing longitudinal sides, which may be inserted into the pockets 6 transversely to the firing direction.

A connection area 3.3 (on the bottom in FIG. 3) has holes like the projections 7 of the passenger airbag module 4, through which screws 5 may be screwed.

To install the passenger airbag module 4 according to the second embodiment, firstly its upper projections 7 in FIG. 3 are inserted transversely to the firing direction, i.e., upward in FIG. 3, into the corresponding complementary pockets 6 and rest on sides of the pockets 6 forming fastening surfaces 8.

The passenger airbag module 4 is shorter than the spacing of the inner walls 3.1 in the direction of the opposing connection areas 3.3 of the module fastening frame 3. Therefore, the upper projections 7 of the passenger airbag module 4 in FIG. 3 may firstly be inserted into the pockets 6 until the passenger airbag module 4 presses against the upper inner wall 3.1 in FIG. 3. This allows the subsequent tilting of the passenger airbag module 4 so that its lower projections 7 in FIG. 3 also align with the corresponding pockets 6. Subsequently, the passenger airbag module 4 is pushed downward in FIG. 3, its lower projections 7 in FIG. 3 being inserted transversely to the firing direction into the corresponding pockets 6. If the passenger airbag module 4 presses against the lower inner wall 3.1 in FIG. 3, the holes in the lower connection area 3.3 in FIG. 3 and the projections 7 align so that the screws 5 may be screwed in and fix the passenger airbag module 4 transversely to the firing direction.

An installation-friendly and reliable connection between passenger airbag module 4 and dashboard support part 1 results through the projections 7 of the passenger airbag module 4, which runs from top to bottom in FIG. 4, inserted into the complementary pockets 6, and the screw connection to the module fastening frame 3. Because the projections 7 are inserted into the pockets 6 transversely to the firing direction and do not engage, both the projections and also the module frame 3 may advantageously be implemented as rigid.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A dashboard support part, comprising:
   an airbag exit opening; and
   a module fastening frame on which a passenger airbag module is directly and removably fastened, the module fastening frame implemented integrally with the dashboard support part, the module fastening frame having a plurality of fastening surfaces for contact of the passenger airbag module that are situated essentially transversely to the firing direction of the passenger airbag module opposite to one another along a circumference of the airbag exit opening,
   wherein at least one of the plurality of fastening surfaces is screwed onto the passenger airbag module, and
   wherein the passenger airbag module is fastened on the module fastening frame, the passenger airbag module inserted into a pocket of the module fastening frame transversely to a firing direction of the passenger airbag module.

2. The dashboard support part according to claim 1, wherein at least one of the plurality of fastening surfaces is implemented in at least one pocket of the module fastening frame.

3. The dashboard support part according to claim 1, wherein at least one of the plurality of fastening surfaces is implemented essentially parallel to a surface of the dashboard support part.

4. The dashboard support part according to claim 1, wherein the module fastening frame is connected to the dashboard support part with at least one rib.

5. The dashboard support part according to claim 4, wherein the module fastening frame is at least partially double-walled along a circumference of the airbag exit opening and the at least one rib is connected to a wall of the module fastening frame in relation to the airbag exit opening.

6. The dashboard support part according to claim 1, wherein the module fastening frame is one piece without a separate reinforcement element.

7. The dashboard support part according to claim 1, wherein the passenger airbag module is exclusively fastened on the module fastening frame.

8. The dashboard support part according to claim 1, wherein at least the module fastening frame is at least partially produced from a plastic.

9. The A dashboard support part, comprising:
an airbag exit opening; and
a module fastening frame on which a passenger airbag module is directly and removably fastened, the module fastening frame implemented integrally with the dashboard support part, wherein the module fastening frame is implemented as at least partially multi-walled along a circumference of the airbag exit opening, and has a plurality of fastening surfaces for contact of the passenger airbag module that are situated essentially transversely to the firing direction of the passenger airbag module opposite to one another along a circumference of the airbag exit opening,
wherein the least one of the plurality of fastening surfaces is screwed onto the passenger airbag module, and
wherein the passenger airbag module is fastened on the module fastening frame, the passenger airbag module inserted into a pocket of the module fastening frame transversely to a firing direction of the passenger airbag module.

10. The dashboard support part according to claim 9, wherein the module fastening frame is located in a corner area of the airbag exit opening.

11. The dashboard support part according to claim 1, wherein the plurality of fastening surfaces are along opposing sides of the airbag exit opening.

12. A dashboard support part comprising:
an airbag exit opening; and
a module fastening frame on which a passenger airbag module is directly and removably fastened, the module fasting frame implemented integrally with the dashboard support part, wherein the module fastening frame is double-walled along a circumference of the airbag exit opening, and has a plurality of fastening surfaces for contact of the passenger airbag module that are situated essentially transversely to the firing direction of the passenger airbag module opposite to one another along a circumference of the airbag exit opening,
wherein the least one of the plurality of fastening surfaces is screwed onto the passenger airbag module, and
wherein the passenger airbag module is fastened on the module fastening frame, the passenger airbag module inserted into a pocket of the module fastening frame transversely to a firing direction of the passenger airbag module.

* * * * *

UNITED STATES PATENT AND TRADEMARK OFFICE
CERTIFICATE OF CORRECTION

| | | |
|---|---|---|
| PATENT NO. | : 8,136,832 B2 | |
| APPLICATION NO. | : 12/680534 | |
| DATED | : March 20, 2012 | |
| INVENTOR(S) | : Ulrich Rick et al. | |

It is certified that error appears in the above-identified patent and that said Letters Patent is hereby corrected as shown below:

Column 7, line 27, "The A dashboard" should be changed to --A dashboard--;
Column 8, line 4, "wherein the least" should be changed to --wherein at least--;
Column 8, line 29, "wherein the least" should be changed to --wherein at least--.

Signed and Sealed this
Fourteenth Day of August, 2012

David J. Kappos
*Director of the United States Patent and Trademark Office*